United States Patent Office 3,420,733
Patented Jan. 7, 1969

3,420,733
METHOD OF CASTING A THIN RESIN FILM LINING INTO A MOLD SURFACE AND THE PRODUCT
Hiroshi Ochi, Hiroshige Taki, Kimio Sugimoto, Yoshimi Hayase, Ogaki, and Bungo Nakazawa, Tokyo, Japan, assignors to Ibigawa Electric Industry Co., Ltd., and Asahi Glass Co., Ltd., a corporation of Japan
No Drawing. Filed Oct. 7, 1963, Ser. No. 314,546
Claims priority, application Japan, Oct. 9, 1962, 37/43,559
U.S. Cl. 161—231                8 Claims
Int. Cl. B32b 27/06; B32b 27/36; B32b 31/00

ABSTRACT OF THE DISCLOSURE

A hardened film having thickness less than 100$\mu$ of etherified methylol polyamino-triazine and oil modified alkyd resin is formed on a plate surface constituting a casting cell. Polymerizable material is cast and polymerized in the cell. Cast sheet of synthetic resin having a hard surface thereon is obtained. An adhesive layer may be applied before casting on the hardened film.

---

The present invention relates to a method for the manufacture of cast sheet of synthetic resin having a hard surface and to cast sheets obtained by the said method and, more particularly, to a method for the manufacture of cast sheets of synthetic resin having a hard surface layer of triazine resin and to cast sheets obtained by the said method.

Various articles have hitherto been known as cast articles of acrylic resin such as polyalkyl acrylate and polyalkyl methacrylate or unsaturated polyester resin. However, surface hardness of such articles is generally not satisfactory. Accordingly, their surface is liable to be damaged and become hazy, decreasing the permeability to the rays of light and spoiling the beauty. In order to improve the surface properties of such cast articles, attempts have been tried to form a surface layer of high hardness directly on the surface of the cast articles. However, articles of high surface gloss may not be obtained by such means.

An object of the present invention is to form a hard and glossy surface on cast sheet of synthetic resin.

Another object of the present invention is to provide an improved method for the manufacture of cast sheet of acrylic resin or unsaturated polyester resin having on its surface a hard and glossy surface layer.

These above-mentioned objects of the present invention may be accomplished in such a manner that a polymerizable material capable of forming a base synthetic resin cast sheet is cast in a casting cell having on its surface a hardened or cured film of etherified methylol polyaminotriazine and modified alkyd resin, and a further adhesive layer thereon, if required, and the polymerizable material is reacted under heating in said cell, and thus, the said polymerizable material is polymerized and simultaneously the reaction product is bonded to said hardened film, after which the resulting cast sheet is taken out of the cell.

The hardened or cured film preliminarily formed on the casting cell in the present invention consists of etherified, methylol polyamino-triazine and modified alkyd resin. As a polyamino-triazine used in the present invention, there may be used, for instance, melamine, namely, triamino-triazine and guanamine derivatives, such as benzoguanamine (2 phenyl-4.6 diamino-1,3,5 triazine) and acetoguanamine (2 methyl-4.6 diamino-1,3,5 triazine). They impart not only hardness to the hardened film, but also enhance the heat resistance and weather-proof property. Furthermore, as is well known to those skilled in the art, they are reacted with formaldehyde to be methylolated, and then etherified further by the alkyl group or alkenyl group having 3 or 4 carbon atoms, for instance, propyl-, butyl- and allyl groups. The methylol polyaminotriazine is improved in its compatibility for alkyd resin by etherification and imparts flexibility to the hardened film. In order that the adhesion of the hardened film to the base sheet resin material may be improved and the release or peeling of hardened film from the casting cell may be facilitated, it is preferable to employ methylol polyamino-triazine in which etherification and condensation have substantially proceeded.

Modified alkyd resin imparts flexibility to the hardened film and further strengthens the adhesion of the hardened film to the base sheet resin. As an alkyd resin there may be used condensation polymers of poly-basic acids such as phthalic acid, maleic acid, fumaric acid, succinic acid and adipic acid with polyalcohols such as ethylene glycol, propylene glycol, glycerine and pentaerithritol, and particularly, phthalic acid may be used preferably. As a modifier, oils such as castor oil, coconut oil, soya oil, safflower-oil and tall oil or acrylics such as methacrylic ester and acrylic ester may be used. In respect of transparency of the hardened film, those modified with acrylics, coconut oil and castor oil are excellent, while in respect of hardness of the hardened film, those modified with castor oil and soya oil are most preferably used. Generally, oils having many unsaturated bonds are advantageous for bonding the hardened film to the base resin, but somewhat disadvantageous in point of coloring and lowering the weather-proof property.

The weight proportion of solid content of triazine resin and modified alkyd resin is so selected that the former may be 80 to 40%, preferably 60 to 40% of the total. When the proportion of triazine resin is beyond the above-mentioned range, the adhesion of the hardened film to the base sheet resin becomes unsatisfactory and, therefore, such proportion of triazine resin is not preferable. On the contrary, when the proportion of modified alkyd resin exceeds said range, the hardness of the hardened film is lowered, and moreover, coloring of the product is liable to occur.

When these both components are coated on the casting cell, both components are uniformly mixed, and then diluted with a solvent, in order to make the coating uniform and easy. The addition of the solvent may be effected at any suitable time from the manufacture of both components to their mixing. As a solvent, any suitable esters, ethers and aromatics may be used, such as acetic acid ester, ethyl-cellosolve, xylene and the like. In order to accelerate hardening of triazine resin, it is preferred to mix and dissolve and suitable hardener or curing agent, such as toluene sulfonic acid, butyl acid phosphate, ethyl acid phosphate, oxalic acid, acetic acid, hydrochloric acid and the like. It is also preferable to add a stabilizer, such as ultra-violet ray absorber and antioxidant, such as trinonylphenyl phosphite, for the purpose of imparting stability to the hardened film.

As a casting cell for casting base sheet resin, any may be used which is constructed into the predetermined shape with glass plate, or metallic plate or any other material having a polished surface. When the casting cell engraved with desired figure or pattern, for instance, figured glass plate and embossed plate are used, articles having such figure or pattern can be obtained. The space of the casting cell may be selected in a range from a few millimeters to several tens of millimeters so that any desired thickness may be given to the cast sheet.

In application or coating of the aforementioned solution on the casting cell, various means such as brushing, spraying, flow coating and so forth may be used. Moreover, this may be accomplished by immersing the casting cell in the solution and then taking out the same.

The casting cell thus coated with solution is heated to harden the resin. The hardening or curing of resin has to be carried out appropriately in such a degree that in the polymerization of base sheet resin, which will be effected later, the hardening or curing reaction of triazine resin may not proceed and a substantial amount of condensation product may not be produced. When the hardening of triazine resin is not appropriate, the condensation by product, such as water, formaldehyde, alcohol and the like, may often give rise to an ugly blemish on the surface of the product. Heating for about 30 minutes at 100 to 170° C., preferably at 120 to 150° C. is appropriate.

It is appropriate to set the thickness of surface layer of cured or hardened film less than 100μ, preferably 30 to 50μ. Too large a thickness gives rise to cracking and peeling, while too small a thickness leads to an insufficient formation of the hard surface layer.

In the casting cell thus formed with a hardened film layer, a polymerizable base sheet resin material is then cast. As a polymerizable material there may be used, for instance, methacrylic esters, acrylic esters, unsaturated polyester resins with crosslinking monomers and mixtures thereof. When acrylics are alone cast, those materials may be cast directly. While when unsaturated polyester resin is used, it is preferred to use an adhesive or adhesive agent, in order to improve the bonding of the base sheet resin to the hardened film. As an adhesive, those adhesives of vinyl resin series, polyisocyanate series and synthetic rubber series may be used alone or in a mixture thereof. Other adhesives are not suitable for use, because they impart color to the products, their adhesiveness is insufficient or their handling is inconvenient. After application to the aforesaid hardened film, the adhesive is dried to evaporate its solvent. As the drying is usually effected at a temperature above 110° C., it is preferred to effect the drying simultaneously with the completion of hardening of triazine resin. For this purpose, it is advisable to coat the adhesive agent on triazine resin after the said triazine resin has hardened or cured to some extent, and then, to heat the triazine resin thus coated with adhesive at the desired temperature.

Acrylics to be cast contain acrylate and methacrylate having 1 to 4 carbon atoms, such as methyl methacrylate, ethyl methacrylate, butyl methacrylate, methyl acrylate, and butyl acrylate. Those acrylate and methacrylate are polymerized singly or copolymerized. It is also possible to cast after having the acrylics polymerized partially to make them into syrup. It is also possible to polymerize partially in advance, as in the case when methyl methacrylate syrup is admixed with methyl acrylate monomer to form a copolymer of methyl methacrylate and methyl acrylate. Moreover, another component such as acrylamide or the like may be admixed to some extent, whenever desired.

As an unsaturated polyester resin, a most typical one is that which has been obtained by reacting glycols with unsaturated dibasic acid such as maleic acid, fumaric acid, citraconic acid and itaconic acid. Also those added with other modifying agent, flame-resisting agent and the like are used. As a crosslinking monomer to unsaturated polyester resin in the present invention, there may be used, for instance, styrene, vinyl toluene, diallyl phthalate, triallyl cyanurate, methacryllic ester, acrylic ester or the like which has generally been known as a crosslinking monomer for unsaturated polyester resin. As styrene is low in cost and methyl methacrylate improves the weather resistance of products, both may be used together.

When sheets of paper, fabric or cloth having colors or figures are preliminarily placed in the casting cell at the same time or before or after the casting of polymerizable resin materials and the resin material is polymerized as such, there are obtained products with such ornamental features included therein.

As a polymerization catalyst for the polymerizable base sheet resin material, peroxide such as benzoyl peroxide, methyl ethyl ketone peroxide or the like peroxide and azobis-isobutyronitrile may be used with or without the addition of accelerator such as cobalt naphthenate, as the case may be. In order to uniformly mix the catalyst with polymerizable material, the catalyst may be added in the pasty form with plasticizer such as dibutyl phosphate. The polymerization is effected under heat in the presence of such catalysts. Usually, the temperature below 100° C. is adopted.

The product is taken out of the casting cell after polymerization reaction. In the removal of the cast sheet with hardened film from the casting cell, it is preferred that the cell is first immersed in a dilute warm aqueous solution of a surface active agent for a suitable period of time, whereby a wedge is driven between the hardened film and the cell. In such a way, synthetic resin cast sheet having a beautiful hard surface is obtainable. In order to easily remove the product from the casting cell, it is also effective to apply a mold release such as lecithin to the casting cell in advance before the hardened film is formed on the casting cell.

Thus-manufactured cast sheets can be used as such or for the desired purposes after ordinary cutting, perforating and other working treatments. On the other hand, the cast sheets can also be subjected under heating to a light degree of working for two dimensional or three dimensional curved surface processings.

The invention is further disclosed in the following examples, which are illustartive but not limitative thereof.

Example 1

1 mol of melamine was mixed while stirring with 37% Formalin corresponding to 6 mols formaldehyde at pH of about 9.0 at 90° C. and methylolated, to which was gradually added 6 mols of n-butanol dissolving 1.0 g. of p-toluene sulfonic acid, and reaction was effected for about 5 hours at 85° C. to 90° C. On cooling and adding with 2.83 mols of xylene after reaction, the liquid separated into two layers. The lower water layer was removed and the upper layer was heated to 80° C. under reduced pressure. Butylation proceeded further, while unreacted formaldehyde and n-butanol evaporating with water. After complete dehydration, xylene solution having resin concentration of 50 weight percent was obtained.

50 parts by weight of the solution thus obtained were uniformly mixed with 50 parts of 50% toluene solution of castor oil modified alkyd resin "Beckosol 1308" (resin of 40% phthalic anhydride, 16% glycerine and 44% castor oil, product of Japan Reichhold Chemicals, Inc.), 40 parts of ethyl acetate and 0.5 part of p-toluene sulfonic acid, and the resulting mixture was filtered by the use of glass fibre cloth. Solution obtained was applied on each one surface of two sheets of tempered glass plates by means of a sprayer. The temperature was raised up to 130° C. in about 30 minutes. Hardening was effected by heating for 30 minutes at 130° C. The thickness of the hardened film formed was about 30μ.

These two sheets of glass plate were held by clamps with the hardened film surface facing inside, around which gasket was inserted, and thus, a casting cell having a 3 mm. thick space was formed. On the other hand, methyl methacrylate monomer was added with 0.5% benzoyl peroxide and the resulting mixture was then partially polymerized under heating until a viscosity of 800 cps. was reached. The syrup thus obtained was cast in said casting cell. The casting cell was maintained consecutively for 2 hours at 60° C., for 2 hours at 80° C., and for 4 hours at 100° C. to effect the polymerization of methyl methacrylate. After polymerization, the clamps were taken off and the casting cell was immersed in warm water containing a small amount of surface active agent, and then withdrawn, after which a wedge was inserted in between the glass plate and the product and then the product was taken out from the cell. Thus, a beautiful cast sheet was obtained.

The percentage haze of the cast sheet prescribed in ASTM D-1003-61 was 4.7%, while the percentage haze of methyl methacrylate polymerized sheet having no hardened film surface layer was 24.0%.

Furthermore, in the measurement of percentage haze, an apparatus described in ASTM D-673-44 was used. However, the hopper of the apparatus was rotated at 7 r.p.m., while the test chip was rotated at 11 r.p.m., and 200 g. of Carborundum powder (30 mesh pass and 60 mesh residue) was made to fall down from a 700 mm. height.

Example 2

50 parts of 50% methylol melamine butyl ether solution in xylene, same as that in Example 1 and 50 parts of 50% toluene solution of "Beckosol 1308" were uniformly mixed with 40 parts of ethyl Cellosolve and 0.8 part of p-toluene sulfonic acid. 5% lecithin solution in xylene was coated on each one surface of 2 tempered glass plates, dried and the above-mentioned thermosetting resin solution was applied thereon. The coated film was heated up to 130° C. in 25 minutes and cured or hardened by maintaining at that temperature for 30 minutes.

A mixture of 5 parts of methyl acrylate monomer and 95 parts of methyl methacrylate syrup added with 0.5% benzoyl peroxide was cast in a casting cell formed of the glass plates obtained in the above-mentioned manner and polymerized by maintaining at 60° C. for 2 hours and at 80° C. for 4 hours under heat. After polymerization, the glass plates were removed. A cast sheet having a hardened surface layer was obtained. The percentage haze of the cast sheet thus obtained was 5.0%.

Example 3

50 parts of 50% methylol melamine butyl ether solution in xylene and 50 parts of 50% toluene solution of "Beckosol 1308," same as those in Example 1, were mixed with 40 parts of ethyl acetate, 0.5 part of butyl acid phosphate and 0.5 part of ultra-violet absorber "Tinnubin P" and the resulting mixture was applied respectively on two tempered glass plates, in the same manner as in Example 1 and then hardened at 140° C. Thereafter 10% methyl iso-butyl ketone solution of "Kanevylak L-A-857," vinyl acetate-vinyl chloride copolymer adhesive agent 7 mol of vinyl chloride, 3 mol of vinyl acetate, small quantity of maleic anhydride (product of Kanegafuchi Chem. Inc., a Japanese corporation) was applied on the hardened films, heated and dried, as is the case of Example 1. In a casting cell constructed in the similar manner to that in Example 1 from the glass plates treated as described above, methyl methacrylate was cast. The percentage haze of the cast sheet thus obtained was 4.4%.

Example 4

By treating ⅔ mol of melamine, ⅓ mol of benzoguanamine and 37% Formalin corresponding to 5 mols formaldehyde in the similar manner to that in Example 1, 50% methylol melamine-benzoguanamine butyl ether solution in xylene-butanol was obtained. 50 parts of the resulting solution and 50 parts of 50% toluene solution of "Beckosol 1308" were mixed with 40 parts of ethyl Cellosolve and 0.5 part of p-toluene sulfonic acid. The solution thus obtained was respectively applied on two tempered glass plates and hardened at 130° C. Thereupon, "Bondmaster Z-782-40," vinyl resin adhesive agent (consisting essentially of vinyl chloride vinyl acetate copolymer, product of Sony Chem. Corporation, a Japanese corporation), diluted to eight-fold with methyl iso-butyl ketone was applied uniformly on the hardened film and dried at 145° C. for 15 minutes. Methyl methacrylate syrup (viscosity 1000 cps.) admixed with 0.5% α,α'-azobis-isobutyronitrile was cast in the casting cell formed with glass plates, and polymerized by heating consecutively at 60° C. for 2 hours and at 80° C. for 2 hours. The percentage haze of the thus-obtained cast sheet was 8.3%.

Example 5

60 parts of 50% xylene solution of methylol benzoguanamine butyl ether (solid content 60%; solvent butanol-xylene) and 40 parts of 50% xylene solution of coconut oil modified alkyd resin "Beckosol J-522" (resin of 44% phthalic anhydride, 24% glycerine, 32% coconut oil, product of Japan Reichhold Chemicals, Inc.) were mixed with 40 parts of ethyl Cellosolve-toluene mixture (1:1) and 0.5 part of ethyl acid phosphate. The resulting solution was respectively applied on one surface of each of two tempered glass plates, heated up to 140° C. by heating for 30 minutes, and further maintained for 30 minutes at that temperature to be hardened. On the hardened film, an adhesive agent layer was formed in the same manner as in Example 4. By using glass plates subjected to this treatment, a casting cell was constructed, in which methyl methacrylate syrup (viscosity 500 cps.) admixed with 0.7% benzoyl peroxide was cast, and then treated in the similar manner to that in Example 1, to obtain polymethyl methacrylate cast sheet having hardened surfaces. The percentage haze of the cast sheet was 17.0%.

Example 6

50 parts of 50% methylol melamine butyl ether solution in xylene-toluene obtained in the similar manner to that in Example 1 and 50 parts of 50% xylene solution of soya oil modified alkyd resin "Beckosol 1307" (resin of 42% phthalic anhydride, 17% glycerine, 41% soya oil, product of Japan Reichhold Chemicals, Inc.) were mixed with 20 parts of ethyl acetate, 20 parts of xylene and 0.5 part of p-toluene sulfonic acid, and the resulting mixture was applied on the surface of tempered glass plates, and heated up to 140° C in 30 minutes and hardened by maintaining the temperature at 140° C. for 30 minutes. On the other hand, 100 parts of 20% ethyl acetate solution of "Desmokol 176," polyisocyanate adhesive agent (isocyanate modified polyester obtained by reacting polybasic carboxylic acid, polyhydroxy alcohol and polyisocyanate, product of Bayer, Germany) were mixed with 5 parts of "Desmodur L" (reaction product of 1 mol trimethylol propane and 3 mol tolylene diisocyanate, product of Bayer, Germany) and the resulting mixture was dissolved in ethyl acetate to obtain a solution of 5% concentration, which solution was applied on the above-mentioned hardened film and dried, after which a casting cell was constructed.

94 parts of methyl methacrylate and 6 parts of methyl acrylate were added with 0.5% benzoyl peroxide, heated and polymerized to obtain a syrup of viscosity 500 cps. This syrup was cast in the above-mentioned casting cell and treated in the same manner as in Example 2. Cast sheet having percentage haze 6.8% was obtained.

Example 7

An equivalent amount of n-propanol was used in place of n-butanol in Example 1, and the reaction was effected under similar conditions to obtain 50% xylene solution of methylol melamine propyl ether. 50 parts of 45% toluene-butanol solution of methyl methacrylate-butyl acrylate modified alkyd resin "Rastrasol OD-A-102" (acrylics content: 35%) and 50 parts of the above-mentioned xylene solution were mixed with 40 parts of ethyl Cellosolve and 0.5 part of p-toluene sulfonic acid, and the resulting mixture was applied on a tempered glass plate, as in Example 1. Thereupon, "Bondmaster Z-782-40", adhesive agent was applied on the hardened film and dried in the same manner as in Example 4. By using glass plates subjected to this treatment, a casting cell was constructed, in which cell was cast a methyl methacrylate syrup (viscosity 1000 c.p.s.) obtained by reacting under heat, after 0.5% of α,α'-azobis-isobutyronitrile was admixed, and polymerized by maintaining consecutively for 2 hours at 60° C. and 2 hours at 80° C. The percentage haze of the resulting product was 13.2%.

Example 8

According to Example 1, a coating film consisting of methylol melamine butyl ether and castor oil modified alkyd resin was formed on tempered glass plates and then hardened by keeping at 100° C. for 15 minutes. Then, "Bondmaster C–319", synthetic rubber-synthetic resin adhesive agent (consisting essentially of synthetic rubber and vinyl chloride vinyl acetate copolymer, product of Sony Chem. Corporation), diluted to eight-fold with methyl isobutyl ketone was applied on the film uniformly and kept for 15 minutes at 145° C. with the result that the solvent in the adhesive agent was evaporated and simultaneously hardening of melamine was almost completed. The glass plates subjected to such treatment were used to construct a casting cell.

80 parts of unsaturated polyester resin "Polylite ODR–426" (70 parts unsaturated polyester of 1 mol maleic anhydride, 2 mol phthalic anhydride, 2 mol propylene glycol and 30 parts cross-linking agent of 7 parts methyl methacrylate, 23 parts styrene, product of Japan Reichhold Chemicals, Inc.), 20 parts of methyl methacrylate and 0.5 part of benzoyl peroxide were mixed together and cast in the casting cell constructed as described above, heated consecutively for 2 hours at 40° C., 4 hours at 60° C. and 1 hour at 80° C. to be hardened. The percentage haze of the cast sheet obtained by taking out from the cell was 4.5%.

Example 9

Excepting that as an adhesive agent, 5% ethyl acetate solution of polyisocyanate adhesive agent in Example 6 was used, the same material was treated under the same condition as in Example 8 to obtain a cast sheet, and the resulting products showed the percentage haze of 7%.

Example 10

50 parts of 50% methylol melamine butyl ether solution in xylene and 50 parts of 50% xylene solution of coconut oil modified alkyd resin "Beckosol J–522" were mixed with 40 parts of ethyl acetate and 0.5 part of p-toluene sulfonic acid, and the resulting mixture was then coated uniformly on each one surface of two tempered glass plates, and heardened by heating for 15 minutes at 100° C. A synthetic rubber-synthetic resin adhesive agent "Bondmaster C–319" diluted to eight-fold with methyl isobutyl ketone was further coated thereon and heated for 15 minutes at 145° C. The glass plates having the layer of adhesive agent and the hardened film one above the other was constructed into a casting cell. An unsaturated polyester resin-styrene-methyl methacrylate mixture was cast in the said casting cell, as in Example 8, and hardened. The percentage haze of products obtained was 7%.

Example 11

According to Example 7, a coating film consisting of methylol melamine propyl ether and acrylics modified alkyd resin was formed on tempered glass plates, maintained for 15 minutes at 100° C. to be hardened. Thereafter, on that coating was applied a solution of "Bondmaster Z–782–40" vinyl resin adhesive agent diluted to eight-fold with methyl isobutyl ketone, and then heated for 15 minutes at 145° C., during which time the solvent was evaporated and simultaneously hardening of melamine resin was almost completed. By using the glass plates, a casting cell was formed, in which cell a mixture of 100 parts of adipic acid modified unsaturated polyester resin "Polylite ODR–449" (70 parts unsaturated polyester of maleic anhydride, phthalic anhydride, propylene glycol and adipic acid and 30 parts of styrene as cross-linking monomer), 0.5 part of methyl ethyl ketone peroxide and 0.5 part of 6% mineral spirit solution of cobalt naphthenate was cast, and hardened by heating consecutively for 2 hours at 40° C., 4 hours at 60° C. and 1 hour at 80° C. The percentage haze of the product taken out of the casting cell was 13.5%.

Example 12

A casting cell was constructed from embossed stainless steel plates coated with a mold release instead of tempered glass plates used in Example 1, and a highly hard-surfaced product was obtained in the similar manner as in Example 1. On the other hand, instead of the tempered glass plates, polished hard chrome-plated plate coated with a mold release was used to obtain similarly a high hard-surfaced product.

What is claimed is:

1. A method for the manufacture of a cast sheet of synthetic resin having a hard surface thereon which comprises forming a hardened film having a thickness less than $100\mu$ from a mixture of (1) an etherified methylol polyamino triazine selected from the group consisting of the propyl and butyl ethers of a methylol of a polyamino triazine selected from the group consisting of melamine, 2-phenyl-4,6-diamino triazine and 2-methyl-4,6-diamino triazine and (2) an oil modified alkyd resin on at least one surface of plates, forming a casting cell from said plates with the hardened film on the interior surface of such casting cell, casting at least one polymerizable material selected from the group consisting of methacrylic esters, acrylic esters and unsaturated polyester resins with a cross-linking monomer in said casting cell, heating the polymerizable material cast in said cell to effect polymerization thereof and bond it to the hardened film and removing the cast sheet with hardened film bonded thereto thus formed from the casting cell.

2. A method for the manufacture of a cast sheet of synthetic resin having a hard surface thereon which comprises forming a hardened film having a thickness less than $100\mu$ from a mixture of (1) an etherified methylol polyamino triazine selected from the group consisting of the propyl and butyl ethers of a methylol of a polyamino triazine selected from the group consisting of melamine, 2-phenyl-4,6-diamino triazine and 2-methyl-4,6-diamino triazine and (2) an oil modified alkyd resin on at least one surface of plates, forming an adhesive coating on the hardened film, forming a casting cell from said plates with the adhesive coated hardened film on the interior surface of such casting cell, casting at least one polymerizable material selected from the group consisting of methacrylic esters, acrylic esters and unsaturated polyester resins with a cross-linking monomer in said casting cell, heating the polymerizable material cast in said cell to effect polymerization thereof and bond it to the hardened film and removing the cast sheet with hardened film bonded thereto thus formed from the casting cell.

3. The process of claim 1 in which said etherified methylol polyamino triazine is methylol melamine butyl ether and the proportions of the methylol amine butyl ether and the oil modified alkyd resin mixture are such that the former is 80 to 40 wt. percent of such mixture and the polymerizable material is methyl methacrylate.

4. A cast sheet of synthetic resin having a hard surface comprising a resin sheet formed of at least one polymer of a member selected from the group consisting of methacrylic esters, acrylic esters and unsaturated polyester resins with a cross-linking agent and a hardened film composed of a hardened mixture of (1) an etherified methylol polyamino triazine selected from the group consisting of the propyl and butyl ethers of a methylol of a polyamino triazine selected from the group consisting of melamine, 2-phenyl-4,6-diamino triazine and 2-methyl-4,6-diamino triazine and (2) an oil modified alkyd resin bonded firmly to the surface of said resin sheet.

5. A cast sheet as in claim 4 in which said film is less than $100\mu$ thick.

6. A cast sheet as in claim 5 in which said film is 30 to $50\mu$ thick.

7. A process as in claim 1 in which said film has a thickness of 30 to $50\mu$.

8. A process as in claim 2 in which said film has a thickness of 30 to 50μ.

References Cited

UNITED STATES PATENTS

| | | | |
|---|---|---|---|
| 2,510,503 | 6/1950 | Kropa | 161—233 X |
| 2,631,960 | 3/1953 | Dafter | 161—233 X |
| 2,765,251 | 10/1956 | Williams | 161—231 X |
| 2,883,315 | 4/1959 | Palmquist | 161—231 X |
| 3,026,228 | 3/1962 | Robinson et al. | 161—233 X |
| 3,072,973 | 1/1963 | Barnette | 264—271 |
| 3,082,180 | 3/1967 | Boldizar et al. | 161—260 X |
| 3,135,645 | 6/1964 | Burkleg et al. | 161—233 X |
| 3,208,894 | 9/1965 | Yanagihara et al. | 161—233 |
| 3,219,734 | 11/1965 | Mattin | 156—246 X |
| Re 24,351 | 8/1957 | Varela et al. | |

FOREIGN PATENTS

| | | |
|---|---|---|
| 622,675 | 5/1945 | Great Britain. |

OTHER REFERENCES

Lee, H., and Neville, K., Epoxy Resins. McGraw-Hill Book Company, N.Y., 1957. TP 986 E 6 L 4 (pp. 154, 155, 156, 158, 159, 160 relied on).

"Handbook of Material Tradenames," Zimmerman and Lavine, 1953 edition, Industrial Research Service, Dover, N.H. page 79. TP–15125.

"Polyesters and Their Applications", Bjorksten Research Laboratories, Reinhold Publishing Corp., New York City, 956, pages 151 and 152.

"Plastics Manual", Scientific Press, London 1962, 3 pages 62, 63.

Amoco Chemicals Corp. Bull. 2571, December 1961, Chicago, Ill., pages 4, 5.

EARL M. BERGERT, *Primary Examiner.*

C. B. COSBY, *Assistant Examiner.*

U.S. Cl. X.R.

156—245; 161—247; 264—250, 255; 156—331